(12) United States Patent
Kitamura et al.

(10) Patent No.: US 7,885,027 B2
(45) Date of Patent: Feb. 8, 2011

(54) MAGNETIC DISK DRIVE WITH ERROR CORRECTION

(75) Inventors: Nobuhito Kitamura, Kanagawa (JP); Hitoshi Yoshida, Kanagawa (JP); Noriyuki Sumiya, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 1191 days.

(21) Appl. No.: 11/516,109

(22) Filed: Sep. 5, 2006

(65) Prior Publication Data

US 2007/0053094 A1 Mar. 8, 2007

(30) Foreign Application Priority Data

Sep. 5, 2005 (JP) .............................. 2005-256117

(51) Int. Cl.
G11B 5/09 (2006.01)
G11B 27/36 (2006.01)

(52) U.S. Cl. ............................... 360/53; 360/31; 360/48

(58) Field of Classification Search ........................ None
See application file for complete search history.

(56) References Cited

U.S. PATENT DOCUMENTS 6,628,583 B1 * 9/2003 Van Den Enden et al. .. 369/47.1

FOREIGN PATENT DOCUMENTS

| JP | 2000-187942 | 7/2000 |
|---|---|---|
| JP | 2001-067605 | 3/2001 |
| JP | 2001-143406 | 5/2001 |
| JP | 2001-273722 | 10/2001 |
| JP | 2001-283532 | 10/2001 |
| JP | 2002-124037 | 4/2002 |
| JP | 2002-532817 A | 10/2002 |
| JP | 2003-257124 | 9/2003 |
| JP | 2004-253042 | 9/2004 |
| JP | 2004-342213 | 12/2004 |
| WO | WO 00/34952 A1 | 6/2000 |

* cited by examiner

*Primary Examiner*—Daniell L. Negrón (57) ABSTRACT

Embodiments of the present invention provide a magnetic disk drive in which the error correction capability of ECC is improved without sacrificing the storage capacity. In one embodiment, a data track adopts a format structure in which no data-to-data gap area is formed in data sectors. When one of the data sectors is updated in a state in which the rotational speed of a magnetic disk does not satisfy specified conditions, a leading end area of a succeeding data sector or a trailing end area of a preceding data sector is overwritten by the data sector. If a read error occurs in the overwritten data sector, ERP steps are executed to perform read retry so that the read error is recovered by means of on-the-fly ECC or erasure correction. In the case of the erasure correction, an erasure pointer equivalent to the maximum number of overwritten bytes is set.

8 Claims, 6 Drawing Sheets

(PRIOR ART)

MAGNETIC DISK DRIVE WITH ERROR CORRECTION

CROSS-REFERENCES TO RELATED APPLICATIONS

This application claims priority from Japanese Patent Application No. JP2005-256117, filed Sep. 5, 2005, the entire disclosure of which is incorporated herein by reference.

BACKGROUND OF THE INVENTION

The present invention relates to a format structure of a magnetic disk by which the error correction capability can be improved without sacrificing the storage capacity, and more particularly to a magnetic disk drive in which the error correction capability is improved by adopting such a format structure.

Figure 7:
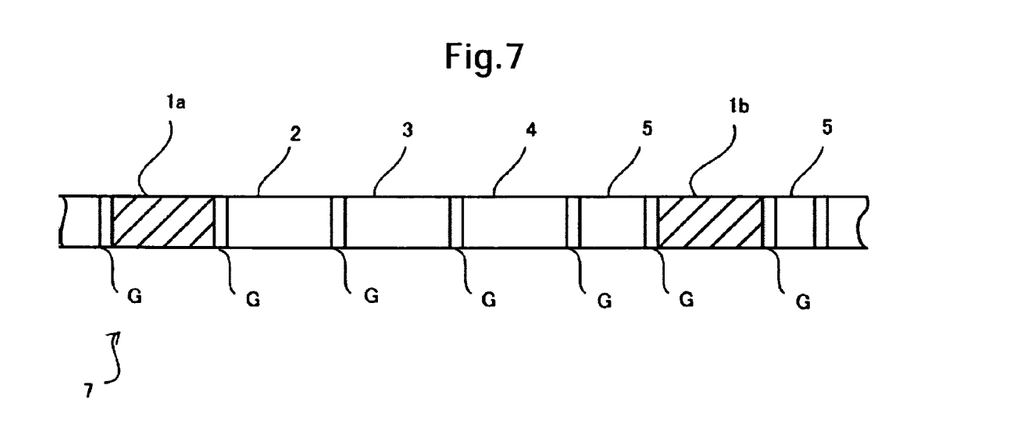
FIG. 7 is a diagram illustrating a format structure of a conventional track.

As far as a magnetic disk drive that adopts a data-surface servo system is concerned (this system is also called a sector servo system or an embedded servo system), as shown in FIG. 7, a plurality of data sectors 2 through 5 are formed between servo sectors 1a, 1b in the circumferential direction of a data track 7 of a magnetic disk with each gap area G being inserted therebetween. The magnetic disk drive is configured as a direct access storage device capable of writing and reading data on a data sector basis. Each of the data sectors 2 through 5 includes: user data; an error correction code (ECC) that is generated on the basis of the user data; and other supplementary data. The data sectors 2 through 5 adopt fixed block architecture (FBA) in which the total length is constant. Because a data sector whose block length is fixed is so formed that the total number of bytes is constant, one data sector occupies, in the circumferential direction of the data track, a write area whose length is proportional to the rotational speed of the magnetic disk.

Another magnetic disk drive adopts an ID-less format system in which address information is eliminated from each data sector. The magnetic disk drive is configured such that pulses having a specified frequency are counted from a servo sector 1 or from another reference position by the number of pulses corresponding to the rotational speed of a magnetic disk for identifying a position of each of data sectors 2 through 5. When the data sector 3 is updated in a state in which data is written to the data sectors 2 through 5, it is necessary to prevent data forming the data sector 2 or the data sector 4 from being overwritten. The rotational speed of the magnetic disk is controlled so that the rotational speed is always kept constant. However, it is not possible to completely suppress the occurrence of rotation jitter. The rotation jitter means the rotation inaccuracy of a magnetic disk. In general, the rotational speed of the magnetic disk contains an error of about +/−0.2% to 0.5% with the specified speed being its center. If the rotation jitter occurs, there is a possibility that adjacent data sectors and a servo sector will be overwritten. Therefore, gap areas G which are not used to write data are formed between the data sectors and between the data sector and the servo sector. Because the gap areas exceed 1% of a recording surface of the magnetic disk, it is useful if the gap areas can be effectively utilized.

Incidentally, in recent years, the recording density of magnetic disk drives increases. As a result, a ratio of the occurrence of read errors also increases. A read error whose number of error bytes is a specified value or less is corrected by hardware processing using ECC, that is, by on-the-fly ECC. Therefore, the delay time of the processing is short, and read operation of the magnetic disk drive is seldom delayed. However, if a read error whose number of error bytes exceeds the error correction capability of ECC occurs, error recovery procedures (ERP) are executed. Therefore, the read error is corrected as a result of read retry including various kinds of recovery operation. Because the error recovery operation performed by executing the ERP takes a long time, it is desirable that a read bit error be corrected by on-the-fly ECC if possible.

Paying attention to the fact that an influence of jitter increases with the increase in the distance between a data sector and a servo wedge, patent document 1 (Japanese Patent Laid-Open No. 2001-273722) discloses a technology in which the length of a gap area formed between a servo wedge and a data sector close to the servo wedge is shortened. Patent document 2 (Japanese Patent Laid-Open No. 2002-124037) discloses a technology in which a gap area and a preamble are eliminated to increase the storage capacity by rewriting data not on a data sector basis, but on a data field basis or on a data track basis. The data field and the data track are constituted of a plurality of data sectors. In patent document 3 (Japanese Patent Laid-Open No. 2001-143406), FIG. 3 of the reference illustrates a format structure in which a data area of a sector is partitioned. In this format structure, two partitioned data areas are provided with only one preamble. A unit of writing is the whole area including the two data areas ranging from the preamble to ECC.

Patent document 4 (Japanese Patent Laid-Open No. 2004-253042) discloses a technology in which a servo-clock synchronization recording method is adopted, and thereby the gap length is shortened to minimize a useless area in a track format. A servo clock is generated by synchronizing dedicated PLL with a read signal of the clock marks. Here, clock marks included in servo areas are used as the reference time. The clock marks are radially formed at intervals of substantially the same angle on a disk. Various kinds of timing signals including a RG pulse and a WG pulse, which are synchronized with this servo clock, are generated. In addition, a bit clock used for writing data is also generated.

BRIEF SUMMARY OF THE INVENTION

The error correction capability of ECC is dependent on the number of symbols on the assumption that 8 bits is equivalent to one symbol. If the number of ECC symbols is increased, the probability of error processing by means of on-the-fly ECC is advanced. This makes it possible to prevent a read error from occurring. However, the storage capacity decreases with the increase in the number of symbols. As described in the background art, because the gap area adopted in the conventional format structure is not used as a storage area, if this area can be used as an additional area of ECC, it is possible to increase the correction capability of ECC without sacrificing the storage capacity.

In general, the magnetic disk drive determines a write start position of a data sector by counting the number of clocks with reference to position information of a servo sector, or position information of index marks, each of which occurs at each rotation of a magnetic disk. Therefore, if the rotational speed of the magnetic disk changes, the write start position of the data sector also fluctuates in the circumferential direction. A write end position of a data sector is a position at which writing of the whole data sector whose length is the specified number of bytes is completed. Accordingly, if the rotational speed at the time of writing changes, the write length of one data sector on a recording medium also changes.

It is also possible to keep a write position and the write length of the data sector constant by changing a clock to be counted to determine a write start position and a frequency of a write clock for determining a frequency of a write current in response to the rotational speed of the magnetic disk. However, a circuit becomes complicated resulting in high costs. This is not practical. For the same reason, it is also difficult to completely make the rotation jitter of the magnetic disk equal to zero. In the past, a gap area was thought to be indispensable for completely preventing the previous data sector or the subsequent data sector from being partially overwritten at the time of updating a data sector. However, if it is ensured that a data sector whose leading end area or a trailing end area is overwritten by another data sector is properly read out, it is possible to use a gap area as an additional area of ECC to improve the correction capability achieved by means of on-the-fly ECC without sacrificing the storage capacity. A feature of the present invention is to provide a magnetic disk drive in which the error correction capability of ECC is improved without sacrificing the storage capacity.

A magnetic disk according to the present invention adopts a format structure in which a data-to-data gap area is eliminated, or the conventional gap area is reduced. Therefore, there arises a case where data sectors overlap each other, and a previously written data sector is partially overwritten by a subsequently written data sector. In a basic format in which data sectors are written at each reference write position under write-position specified conditions, the trailing end of a first data sector and the leading end of a second data sector may be adjacent to each other, or a gap area whose length is less than twice the maximum number of shifted bytes may also be formed between the first and second data sectors. If the first data sector is written in a direction toward the second data sector in the write-position allowable limit state and then the second data sector is written in a direction toward the first data sector in the write-position allowable limit state, even if a gap area whose length is less than twice the maximum number of shifted bytes is formed as a basic format, a leading end area of the second data sector always overwrites a trailing end area of the first data sector. If writing means writes the first data sector between the reference write position thereof and the maximum shift write position thereof, and then writes the second data sector between the reference write position thereof and the maximum shift write position thereof, there are cases where the leading end area of the second data sector overwrites the trailing end area of the first data sector, and where the leading end area of the second data sector does not overwrite the trailing end area of the first data sector.

The write-position specified conditions mean that various factors of determining each write start position of each data sector with respect to a rotating magnetic disk are in a reference state. The write-position allowable limit state means a state of each determining factor at a point of time when as a result of combining factors which have fluctuated, a write start position of a data sector shifts to the largest extent from a reference write position that is a write start position under the write-position specified conditions. The maximum number of shifted bytes is the number of bytes that is equivalent to the difference between a reference write position and a write start position in the write-position allowable limit state (that is to say, a maximum shift write position). The maximum number of overwritten bytes is the maximum number of bytes that are overwritten when two data sectors are individually written in the maximum allowable position limit state with the two data sectors being located in proximity to each other.

When data sectors are written in each reference write position in the basic format with the data sectors being adjacent to one another, if one data sector is updated in a state in which the write-position specified conditions are not satisfied, part of the updated data sector always overwrites part of a data sector written at another reference write position. In the basic format in which a gap area whose length is less than twice the maximum number of shifted bytes is formed between data sectors, when a write is made at a reference write position, if two data sectors are individually updated in the write-position allowable limit state with the data sectors being located in proximity to each other, both of the two data sectors always partially overlap each other. However, if two data sectors are written in an intermediate state between the write-position allowable limit state and the write-position specified conditions with the two data sectors being located in proximity to each other, there are cases where both of them overlap each other, and where both of them do not overlap each other.

If data sectors partially overlap each other, the leading end area or the trailing end area of the previously written data sector is overwritten by the subsequently written data sector. This causes a bit error to occur at the time of reading. If a data sector is overwritten and a read error occurs, since an error correction cannot be made by means of on-the-fly ECC, a program whose recovery means adopts error recovery procedures is executed. By using a data-to-data gap area that is eliminated or reduced as an additional area of ECC, it is possible to increase the correction capability of ECC without sacrificing the storage capacity. If the correction capability of ECC is improved, even if a bit error occurs, the capability of recovering an error by means of on-the-fly ECC is improved.

The leading end area of a data sector can be formed of a preamble; and the trailing end area of the data sector can be formed of a postamble. In this case, the leading end of the data sector becomes a first bit of the preamble; and the trailing end becomes a last bit of the postamble. A recovery mechanism recovers a read error of a data sector, part of which is overwritten, by means of read retry and on-the-fly ECC by executing each step of error recovery procedures. Further, the recovery mechanism recovers a read error by erasure correction in which the maximum number of overwritten bytes is set as an erasure pointer counted from the trailing end of the data sector where the read error has occurred. Here, the maximum number of overwritten bytes is calculated on the basis of the maximum number of shifted bytes and the number of bytes of a data-to-data gap area formed in the basic format.

When host equipment issues one write command to a magnetic disk drive, data corresponding to the write command is often written to a plurality of data sectors in succession. When the data is successively written to the data sectors that are lined up in order, even if the writing is performed in a state in which the write-position specified conditions are not satisfied, what is shifted is only a write start position of the first data sector. In other words, a write start position of the subsequent data sector does not shift. Accordingly, data sectors never overlap each other. In this case, even if the rotation jitter of the magnetic disk occurs, the writing can be performed so that the data sectors become adjacent to one another. Even if a data sector is individually written or updated, the data sector is usually written or updated nearly under the write-position specified conditions. Accordingly, in general, the number of bytes of actually overwritten data is sufficiently smaller than the maximum number of shifted bytes. Therefore, even if the erasure correction is performed, there is a low possibility that the performance will decrease. Therefore, according to the present invention, the additional area of ECC, which is formed without decreasing the storage capacity, effectively functions. This results in an improvement in error correction capability.

According to the present invention, it becomes possible to provide a magnetic disk drive in which the error correction capability of ECC is improved without sacrificing the storage capacity.

DETAILED DESCRIPTION OF THE INVENTION

Figure 1:
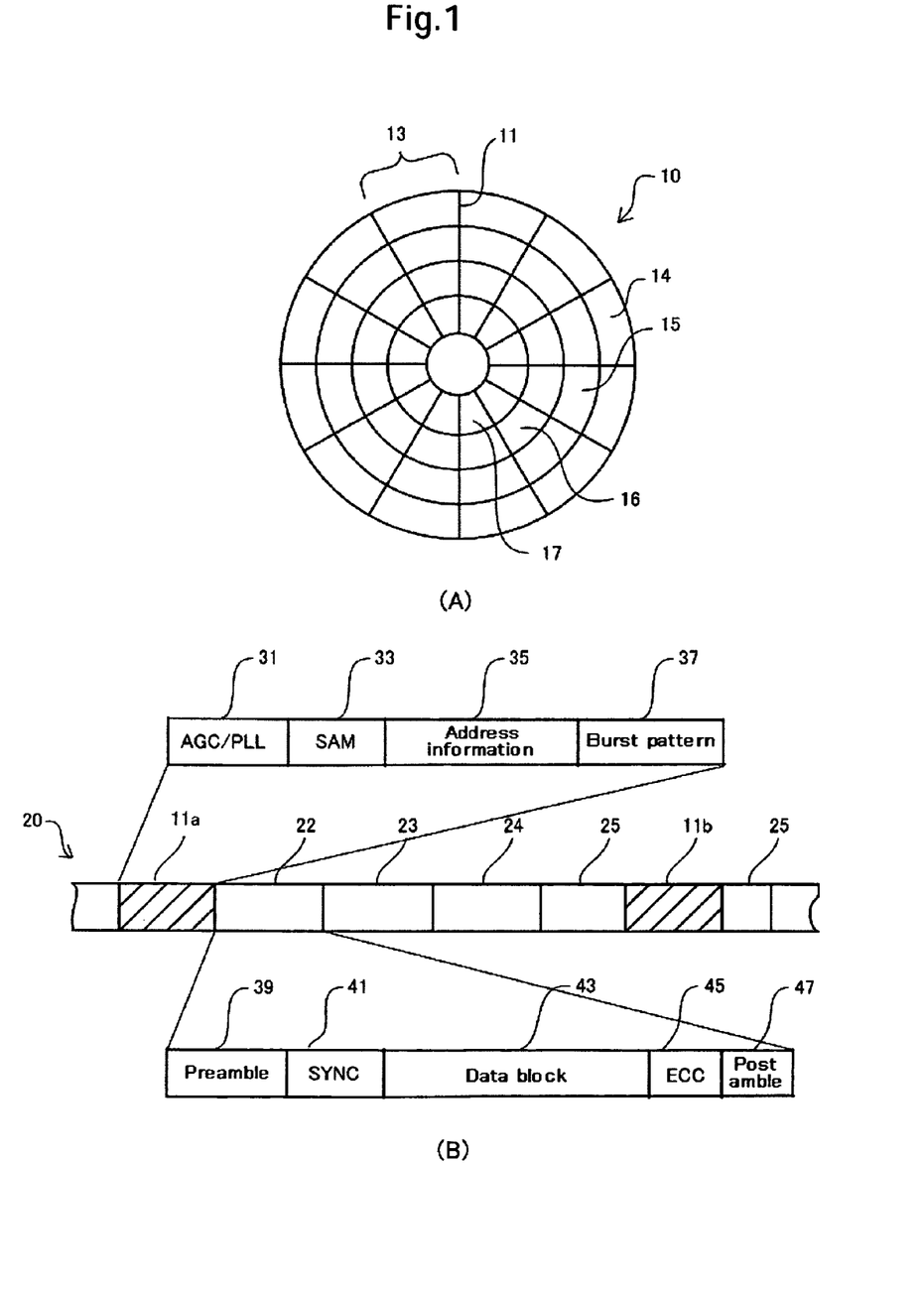
FIGS. 1(A) and 1(B) are diagrams each illustrating a format configuration of a magnetic disk according to an embodiment of the present invention.

FIGS. 1(A) and 1(B) are diagrams each illustrating how a format of a magnetic disk is configured, the format being adopted in a magnetic disk drive according to an embodiment of the present invention. As shown in FIG. 1(A), a plurality of servo sectors 11 which radially extend in the radial direction are written to a magnetic disk 10. Data areas 13 are located between each of the servo sectors 11. A plurality of data sectors are written to each data area 13. As for the number of recorded bits per unit length in the circumferential direction, the number of recorded bits on the outer circumferential side is equalized to that on the inner circumferential side as much as possible so that the storage capacity is increased. For this reason, the magnetic disk 10 is partitioned into four zones 14 through 17 in the radial direction. In each zone, the number of data sectors written to the data area 13 is the same. However, in a zone that is closer to the outer circumferential side, the number of data sectors included in each data area 13 is made larger, and a frequency of a write electric current, or that of a write clock, is made higher. On the magnetic disk 10, a plurality of data tracks are concentrically defined by servo data written to each servo sector.

FIG. 1(B) is a diagram illustrating a format structure of a typical data track 20. In the data track 20, data sectors 22 through 25 are located between two servo sectors 11a and 11b so that the data sectors 22 through 25 are located adjacent to one another. The servo sectors 11a and 11b and the data sectors 22 through 25 are located in the same data track 20. However, in a magnetic head having a structure in which a write head and a read head are separated, which is adopted in this embodiment, a dual head offset (DHO) or a read/write offset exists between both of the heads. Therefore, there is usually no direct correspondence relationship. To be more specific, the servo sector 11a located on the data track 20 is usually used as position information of a data sector written to another data track.

Because the data sector 25 is divided into two by the servo sector 11b, the data sector 25 is, what is called, a split sector, which makes it possible to increase the efficiency in writing. Each of the servo sectors 11a, 11b includes an AGC/PLL pattern 31, a servo address mark (SAM) 33, address information 35, and a burst pattern 37.

The AGC/PLL pattern 31 is used to adjust a gain of an automatic gain controller (AGC) for configuring a read/write channel, and to synchronize a servo clock used for reading subsequent servo data. The servo address mark (SAM) 33 is used to detect a starting position of servo data, which indicates the timing in which a read signal of the servo data is handled, and also to generate a read gate signal (RG signal) or a write gate signal (WG signal). The address information 35 includes: a servo sector number that indicates a position of a servo sector in the circumferential direction; and a cylinder number that indicates a position in the radial direction, the cylinder number being written with a gray code. The address information 35 is used to identify positions of the data sectors 22 through 25. The burst pattern is used to correct, during track following operation, a deviation in position of a magnetic head in the radial direction relative to a target position.

The data sector 22 is constituted of a preamble 39, a synchronization code (SYNC) 41, a data block 43, an error correction code (ECC) 45, and a postamble 47. The other data sectors have also the same configuration. The preamble 39 has a length of 20 bytes, and is used to synchronize a phase and a frequency of a read clock on a bit basis before user data is read out. The SYNC 41 is used to acquire a starting position of user data by a particular pattern that is not included in patterns of an RLL method. The data block 43 is an area having a length of 512 bytes, in which user data modulated by the RLL method is written.

The ECC 45 is an error correction code that is the Reed-Solomon code generated at the time of writing data on the basis of user data. In this embodiment, the number of symbols of the ECC 45 is 62 to which the conventional number of symbols (54 symbols) is increased by 8. One symbol is constituted of 8 bytes. The error correction capability increases with the increase in the number of symbols. The postamble 47 is constituted of 5 bytes. The postamble 47 is used to end the maximum likelihood detection in an information reproduction method called PRML in which a partial response (PR) method and a maximum likelihood (ML) method are used in combination. Each data sector adopts FBA, the total number of bytes of which is constant. Here, the total number of bytes includes a data block and other additional parts.

Figure 2:
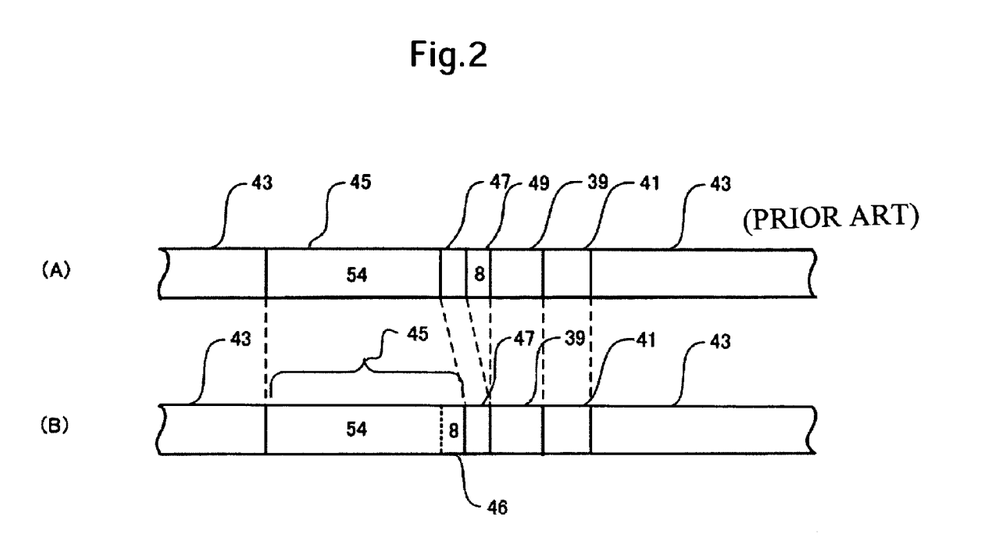
FIGS. 2(A) and 2(B) are diagrams illustrating a conventional format structure of a data track and a format structure according to this embodiment.

FIG. 2(A) is a diagram illustrating a format structure of a conventional data track; and FIG. 2(B) is a diagram illustrating a basic format structure of a data track according to this embodiment. Identical reference numerals are used to designate elements similar to those illustrated in FIG. 1(B). In the conventional format structure shown in FIG. 2(A), the ECC 45 having a length of 54 bytes and a gap area 49 having a length of 8 bytes are formatted. In contrast to this, in the format structure according to this embodiment, which is shown in FIG. 2(B), the gap area 49 is eliminated, and an additional ECC 46 having a length of 8 bytes is added to the ECC 45. As a result, the total length of the ECC 45 becomes 62 bytes. Next, the postamble 47 is adjacently provided with no gap being formed between the postamble 47 and the preamble 39 of an adjacent data sector. The format structure shown in FIG. 2(B) is a format structure in which each data sector is written under write-position specified conditions, which will be described later. When data sectors are written in a state in which the write-position specified conditions are not satisfied, a gap area is formed between the data sectors, or the data sectors partially overlap each other, which results in the formation of a different format. This will be described in detail later.

Figure 3:
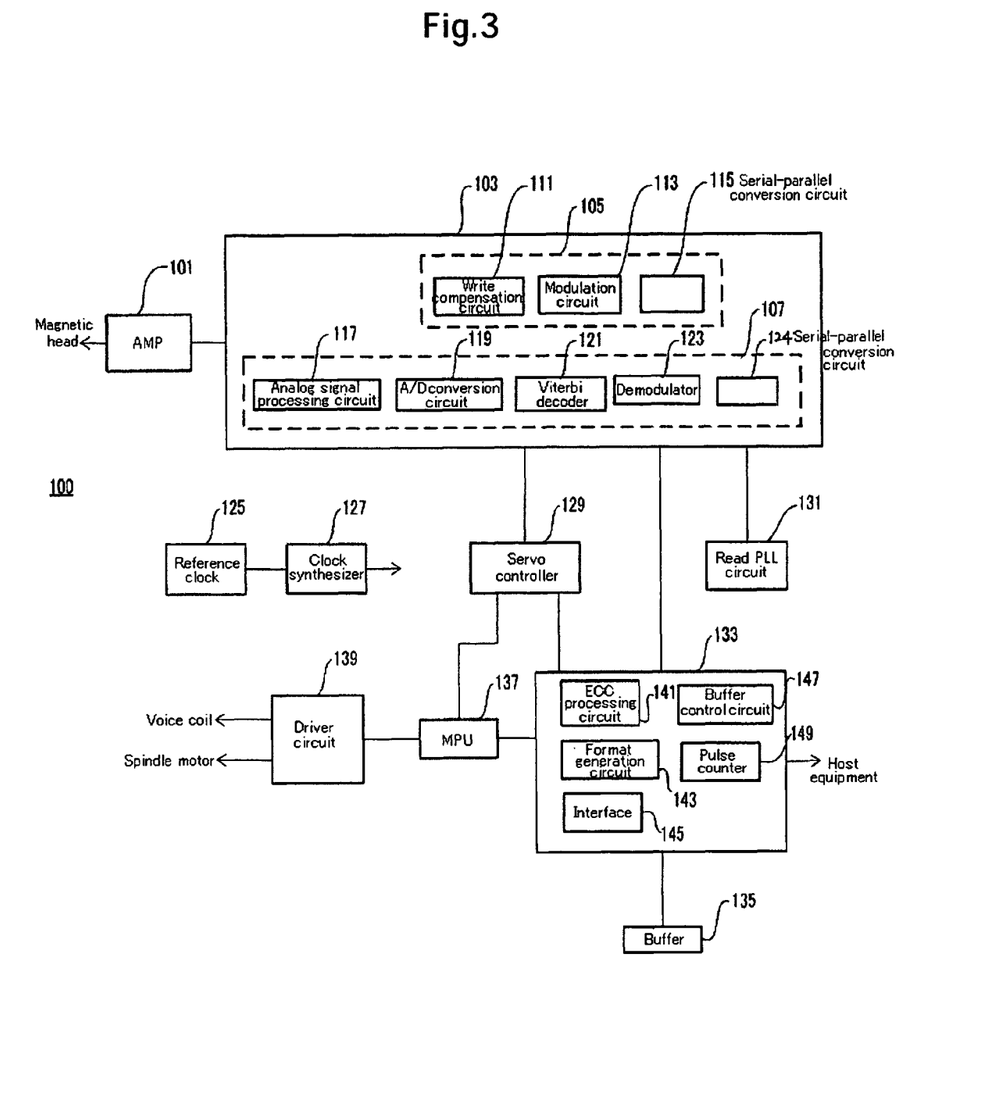
FIG. 3 is a block diagram schematically illustrating a configuration of a magnetic disk drive according to an embodiment of the present invention.

FIG. 3 is a block diagram schematically illustrating a configuration of the magnetic disk drive 100 according to the embodiment of the present invention. The magnetic disk drive 100 is configured as a direct access storage device capable of writing, and reading, data on a data sector basis. A head amplifier 101 is connected to a magnetic head that is formed on a head/slider. Elements which are built into the head amplifier 101 includes: a write driver for amplifying a write current corresponding to a write clock to write data; a read amplifier for detecting and amplifying a read signal; and a head selection circuit. When a hard disk controller (HDC) 133 asserts a WG signal, a driving current is supplied to a write head selected by the head amplifier 101, and thereby data is written. When the hard disk controller 133 asserts a RG signal, or when the hard disk controller 133 negates a WG signal, magnetic recording information passing through a selected read head is read. The read/write channel 103 modulates data to be written to the magnetic disk 10, and then outputs the modulated data to the head amplifier 101. In addition, the read/write channel 103 demodulates a signal read from the magnetic disk, and then outputs the demodulated signal to the HDC 133.

The read/write channel 103 includes a write system circuit 105, and a read system circuit 107. The write system circuit 105 includes a serial-parallel conversion circuit 115, a modulation circuit 113, and a write compensation circuit 111. The serial-parallel conversion circuit 115 converts parallel data, which is transmitted from the HDC 133 on a byte basis, into serial data to be handled on a bit basis. The modulation circuit 113 converts a bit string of write data, which is transmitted from the HDC 133, into a write code of an RLL method. The write compensation circuit 111 adjusts the timing of feeding a write current so as to correct a change in magnetization transition point of data to be written later, the change being caused by a demagnetizing field of data written on a medium.

The read system circuit 107 includes an analog signal processing circuit 117, an analog/digital conversion circuit 119, a Viterbi decoder 121, a demodulator 123, and a serial-parallel conversion circuit 124. The analog signal processing circuit 117 is a circuit that handles a read signal received from the head amplifier 101 and includes an automatic gain control circuit (AGC) and a waveform equivalent circuit (equalizer). The analog/digital conversion circuit 119 samples, with a read clock, an analog read signal received from the analog signal processing circuit 117 to convert the analog read signal into digital data. The read clock is supplied from a read PLL circuit 131. The read system circuit 107 adopts information reproduction method, which is called PRML, in which a partial response method and a maximum likelihood method are used in combination. The Viterbi decoder 121 generates, from a digital read signal received from the analog/digital conversion circuit 119, decoded data of an RLL code in a maximum likelihood decoding system using a Viterbi decoding method.

The demodulator 123 converts the RLL code received from the Viterbi decoder into user data. The serial-parallel conversion circuit 124 converts bitwise serial data into bytewise parallel data, and then outputs the converted parallel data to the HDC 133. The read PLL circuit 131 receives, from an analog/digital conversion circuit 119, a read clock acquired when the preamble 39 of a data sector is read. With a channel clock received from a clock synthesizer 127 being synchronized with the read clock, the read PLL circuit 131 transmits the channel clock to the read system circuit 107. The read system circuit 107 operates with a read clock that is synchronized with the read clock of the preamble on a data sector basis. When the channel clock is not synchronized with the read clock of the preamble, the read PLL circuit 131 transmits, to the write system circuit 105, the channel clock received from the clock synthesizer 127. The write system circuit 105 uses as a write clock a channel clock, which is transmitted from the read PLL circuit 131 at the time of writing data, to perform write operation.

The HDC 133 includes: an interface 145 for transmitting a command and data between host equipment, a MPU 137, and the read/write channel; an ECC processing circuit 141; a buffer control circuit 147; a format generation circuit 143; and a pulse counter 149. The ECC processing circuit 141 generates ECC from data transmitted from the host equipment, and detects a bit error from read data to perform error correction. The ECC processing circuit 141 of the HDC 133 calculates a position at which a bit error has occurred, and correction contents of the bit error, from read data and ECC so that the bit error is corrected. This processing is called on-the-fly ECC. In the on-the-fly ECC, the ECC processing circuit 141 calculates a bit position at which an error has occurred, and a correction value. If the Reed-Solomon correction code is used, it is possible to correct an error having a length of n byte by use of ECC having 2n symbols.

Therefore, when the on-the-fly ECC is applied, and when the conventional format structure shown in FIG. 2(A) is used, the correction capability of ECC having a length of 54 bytes is 27 bytes. On the other hand, when the format structure according to this embodiment shown in FIG. 2(B) is used, the correction capability of ECC having a length of 62 bytes is 31 bytes. The correction capability of the on-the-fly ECC means that by paying attention to the whole data including data on which the calculation of ECC is based and the ECC, even though a position at which an error has occurred is not known, if the number of bytes is equivalent to the correction capability or less, the error can be corrected. Because the ECC processing circuit 141 handles the on-the-fly ECC by means of hardware, the processing time is short, and accordingly there is little delay in read time. In the case of the on-the-fly ECC, if an error cannot be recovered, the error becomes a read error, which is handled by means of software in the ERP described later.

The buffer control circuit 147 controls a buffer 135. The format generation circuit 143 generates additional part of a data sector, and then couples data transmitted from the host equipment at the time of writing data with ECC generated by the ECC processing circuit 141 so as to form a data sector format shown in FIG. 1(B). On the receipt of a servo pulse (SP) from the servo controller 129, the pulse counter 149 counts the number of clocks required to generate a RG signal or a WG signal, and then outputs the RG signal or the RG signal to the read/write channel 103. The pulse counter 149 further outputs, to the read/write channel 103, a servo gate signal (SG signal) for operating the read system circuit 107 at a position of a servo sector.

The buffer 135 temporarily stores data when data is transmitted between the host equipment and the magnetic disk drive. The MPU 137 receives a command from the HDC 133, and controls the total operation of the magnetic disk drive. On the receipt of a servo interrupt signal from the servo controller 129, the MPU 137 starts servo processing, and then outputs to the driver circuit 139 a signal for controlling a position of the magnetic head. The MPU 137 outputs, to the driver circuit 139, a signal sensed by a known method for keeping the rotational speed of the magnetic disk at specific rotational speed. The driver circuit 139 includes a driver used to drive a voice coil motor for moving the magnetic head, and a spindle motor for rotating the magnetic disk. A reference clock 125 is formed of a crystal oscillator, and generates a reference clock used in the magnetic disk drive. The clock synthesizer 127 generates, on the basis of the reference clock, clocks in various frequencies used in the magnetic disk drive.

On the basis of servo data received from the read system circuit 107, the servo controller 129 transmits a servo interrupt signal and position information about the magnetic head to the MPU 137. In addition, the servo controller 129 transmits a servo pulse (SP) to the HDC 133 in the timing in which SAM 33 is detected.

Write Operation

Next, a method for writing and reading data in the magnetic disk drive 100 according to this embodiment will be described. When the magnetic disk drive 100 starts operation, the HDC 133 receives write data and a write command from the host equipment. The write command includes address information of a data sector to which the write data is written. The write data is temporarily stored in the buffer memory 135. The ECC processing circuit 141 generates ECC from the write data. The format generation circuit 143 forms a format shown in FIG. 2(B) and transmits data of the whole data sector to the read/write channel 103. The write command is transmitted to the MPU 137 together with address information. The MPU 137 controls the magnetic disk drive so that the magnetic disk drive starts the write operation. The HDC 133 operates the pulse counter 149 to count clocks with reference to a detection signal of the SAM 33 included in the most recent preceding servo sector received from the servo controller 129. The HDC 133 then transmits, to the read/write channel 103, a SG signal that is asserted at a starting position of servo data of the subsequent servo sector and that is negated at an end position of the servo data.

The read/write channel 103 which has received the SG signal operates the read system circuit 107 and the head amplifier 101 in a read mode. The servo controller 129 receives, from the analog signal processing circuit 117, an AGC read signal acquired when the AGC/PLL 31 of the servo sector is read. The servo controller 129 then adjusts an AGC gain of the analog signal processing circuit 117. Moreover, the servo controller 129 synchronizes a PLL circuit included in the servo controller with an AGC read signal to generate a servo clock so that the analog/digital conversion circuit 119 performs sampling operation with the generated servo clock to detect the SAM 33 and the address information 35 of the servo sector. When the servo controller 129 detects the SAM 33, the servo controller 129 transmits a servo interrupt signal to the MPU 137 to instruct the MPU 137 to start servo processing. The servo controller 129 transmits to the MPU 137 the address information 35 of the servo sector that has been read. The MPU 137 identifies a current position of the magnetic head by use of the address information 35 and calculates the difference between the current position and a position of a target cylinder that has been received from the host equipment, before it transmits to the driver circuit 139 a signal for controlling the voice coil motor.

In the timing in which the SAM 33 is detected, the servo controller 129 transmits to the HDC 133 a servo pulse (SP) indicating a starting position of the servo sector. When the HDC 133 receives the servo pulse (SP), the pulse counter 149 counts the number of clocks corresponding to the time taken before the write head arrives at a starting position of a target data sector to be written. Then, the HDC 133 transmits a WG signal to the write system circuit 105 of the read/write channel 103. Clocks to be counted are supplied from the clock synthesizer 127. The read/write channel 103, which has received the WG signal, writes a data sector having a specified format transmitted from the HDC 133 to the magnetic disk through the head amplifier 101.

Write Position of Data Sector

Figure 4:
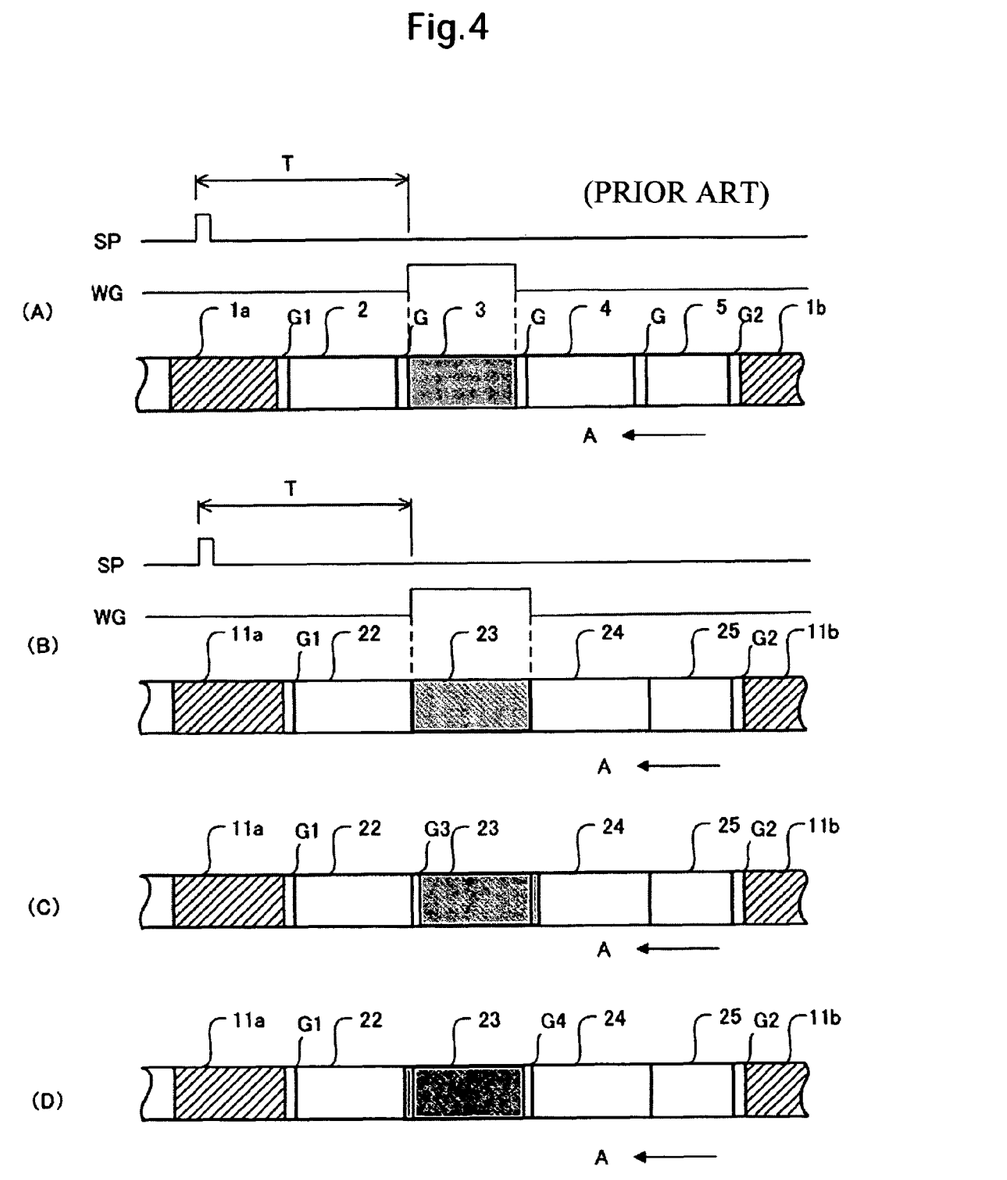
FIGS. 4(A) through 4(D) are diagrams each illustrating a method for determining a write position of a data sector.

A method for determining a write position of a data sector will be described with reference to FIGS. 4(A) through 4(D). This embodiment adopts a format structure in which a gap area between data sectors is eliminated to increase the number of ECC symbols as shown in FIG. 2(B). FIG. 4(A) is a diagram illustrating a basic format structure adopted in the conventional magnetic disk drive. Data sectors 2 through 5 are written between two servo sectors 1a and 1b with each gap area G being formed before and after each of the data sectors 2 through 5. Here, it is assumed that the data sectors 2 through 5 are moving in a direction of an arrow A by the rotation of the magnetic disk. When the data sector 3 is individually written, a write start position corresponds to a position at which the HDC 133 asserts a WG signal with reference to the elapsed time T from a rising edge of the servo pulse (SP) generated by the servo controller 129 in response to the detection of SAM. On the other hand, a write end position corresponds to a position at which writing of the whole data sector ends to negate the WG signal.

Factors of determining a write start position and a write end position of a data sector include: a clock frequency that determines the elapsed time T; the rotational speed of the magnetic disk; and the timing of asserting the WG signal. However, the rotational speed of the magnetic disk is a dominant factor. Here, when all of these individual determining factors are under specified conditions, this state is called write-position specified conditions. A write start position at the time of writing a data sector in a state in which the rotational speed of the magnetic disk fluctuates around the specified speed deviates in the circumferential direction from a write start position based on the specified speed. For example, if the rotational speed of the magnetic disk becomes higher than the specified speed, the data sector 3 is written at a position that is shifted to the data sector 4 side. On the other hand, if the rotational speed of the magnetic disk becomes lower than the specified speed, the data sector 3 is written at a position that is shifted to the data sector 2 side.

Hereinafter, a write start position of a data sector under the write-position specified conditions is called a reference write position. The factors of determining a write start position of a data sector with respect to a rotating magnetic disk fluctuate around the reference write position due to the rotation jitter of the magnetic disk, or the like. However, the magnetic disk drive is so configured that the fluctuation of each factor falls within a specified range. As a result of combining factors that have fluctuated, if a write start position of a data sector shifts from the reference write position to the largest extent, a state of each determining factor at this point of time is called a write-position allowable limit state. The number of shifted bytes, which is allowed in a normal operation range of the magnetic disk drive in question relative to a reference write position of a write start position of a data sector, is given as the write-position allowable limit state. Hereinafter, a write start position in the write-position allowable limit state is called a maximum shift write position; and the number of bytes equivalent to the difference between the reference write position and the maximum shift write position is called the maximum number of shifted bytes.

Figure 5:
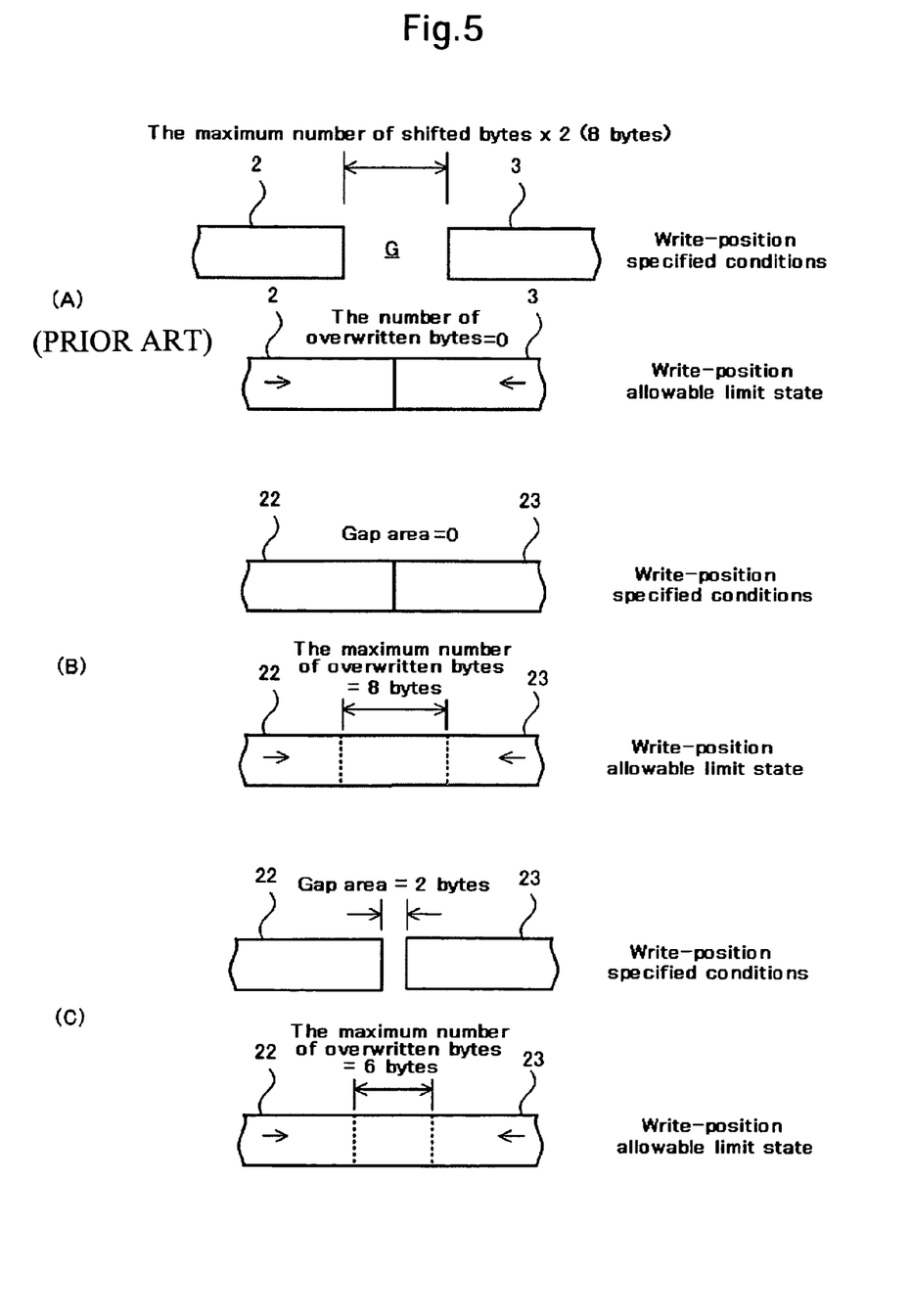
FIGS. 5(A) through 5(C) are diagrams each illustrating the maximum number of overwritten bytes.

According to the conventional format structure shown in FIG. 4(A), the gap areas G1 and G2 are formed between data sectors; and data-to-servo gap areas G1 and G2 are formed between the data sector 2 and the servo sector 1a, and between the data sector 5 and the servo sector 1b, respectively. As shown in FIG. 5(A), it is assumed that in the basic format in FIG. 4(A), the maximum number of shifted bytes is set at 4 bytes, and that when both the data sector 2 and the data sector 3 are written at each reference write position, a data-to-data gap area G is set at 8 bytes.

In the format structure shown in FIG. 4(A), there is the data-to-data gap area G having a length of 8 bytes, which is equivalent to twice the maximum number of shifted bytes. Therefore, even if the data sectors 2 and 3 are written at each maximum shift position in a manner that the data sectors 2 and 3 near each other, a trailing end area of the data sector 2 does not overlap a leading end area of the data sector 3. As a result, the subsequent data sector does not overwrite part of the data sector that has been previously written. In FIG. 5(A), when the data sector 3 is written at a position shifted in the left direction by 4 bytes that is the maximum number of shifted bytes and when the data sector 2 is written at a position shifted in the right direction by 4 bytes that is the maximum number of shifted bytes, the two data sectors get near each other to the maximum. However, by forming a data-to-data gap area whose length is longer than or equal to 8 bytes that is equivalent to twice the maximum number of shifted bytes, the partial overwriting to a data sector is avoided.

FIGS. 4(B) through 4(D) are diagrams each illustrating a format used when determining a write position of a data sector using a method according to this embodiment. Each individual data sector shown in FIG. 4(B) is the same as that in the format structure shown in FIG. 2(B). However, by forming the data-to-servo gap area G1 between the servo sector 11a and the data sector 21 and by forming the data-to-servo gap area G2 between the data sector 25 and the servo sector 11b, a data-to-data gap area is eliminated. FIG. 4(B) is a diagram illustrating an example of a basic format according to this embodiment. The basic format means a format used when each data sector is written at a reference write position thereof. Because an influence of the rotation jitter on the data-to-servo gap area G1 is smaller than that on the data-to-servo gap area G2, it is possible to decrease the number of bytes.

In addition, paying attention to the data sector shown in FIG. 4(B), an ECC area is added by the length equivalent to the data-to-data gap area as shown in FIG. 2(B). Accordingly, the total number of bytes of the data sector is larger than that of the data sector shown in FIG. 4(A) by 8 bytes that corresponds to the gap area. However, the write efficiency for a medium is the same as that in the case of FIG. 4(A).

The basic format in FIG. 4(B) shows a state in which the elapsed time T from a servo pulse (SP) is measured to assert a WG signal under the write-position specified conditions in a manner similar to that shown in FIG. 4(A) so that data sectors 22 through 25 are individually written at each reference write position. The trailing end of each data sector and the leading end of the subsequent data sector are adjacently located at the reference write positions thereof with no gap area being formed therebetween. In this specification, "adjacent" means a state in which two data sectors do not overlap each other, and are located in succession substantially on a write clock basis. In this embodiment, sectors are written in a manner that the postamble 47 of each data sector is adjacent to the preamble 39 of the subsequent data sector. Because the magnetic disk drive is controlled so that the write-position specified conditions are kept unchanged, each data sector is written at a write start position based on a reference write position on a magnetic disk.

When the data sector 23 among the data sectors 22 through 25 adjacently written is individually updated, if the rotation jitter occurs in the magnetic disk and the speed exceeds the specified value, even if a WG signal is asserted with the elapsed time T as shown in FIG. 4(C), a write position of the data sector 23 shifts to the data sector 24 side. As a result, the trailing end area of the data sector 23 overwrites the leading end area of the data sector 24. On the other hand, when the data sector 23 is updated, if the rotation jitter occurs in the magnetic disk and the speed becomes slower than the specified value, even if a WG signal is asserted with the elapsed time T as shown in FIG. 4(D), a write position of the data sector 23 shifts to the data sector 22 side. As a result, the leading end area of the data sector 23 overwrites the trailing end area of the data sector 22.

In the basic format shown in FIG. 4(B), when the data sector 23 is updated in a state in which the write-position specified conditions are not satisfied, part of the data sector written at the reference write position thereof is always overwritten. When both of the data sectors 22 and 23 are individually written in the write-position allowable limit state with the data sector 22 being located in proximity to the data sector 23, both of write start positions of the data sectors 22 and 23 are shifted by the maximum number of shifted bytes. Therefore, as shown in FIG. 5(B), an overwritten area having a length of 8 bytes is formed. When two data sectors are individually written in the maximum allowable position limit state with the two data sectors being located in proximity to each other, the maximum number of bytes which are overwritten at this point of time is called the maximum number of overwritten bytes.

If a data-to-data gap area is formed between data sectors in the basic format, a value of the maximum number of overwritten bytes varies. In this case, according to the present invention, the number of bytes of the data-to-data gap area is set at a value that is less than twice the maximum number of shifted bytes. As shown in FIG. 5(C), if the basic format is so configured that the number of bytes of the data-to-data gap area becomes 2, when both of the data sectors 22 and 23 are individually written in the write-position allowable limit state with the data sector 22 being located in proximity to the data sector 23, the maximum number of overwritten bytes becomes 6. If the number of bytes of the data-to-data gap area is less than twice the maximum number of shifted bytes or if a format structure which includes no data-to-data gap area is adopted, an additional ECC can be written to an area equivalent to the difference from the conventional data-to-data gap area. Accordingly, it is possible to increase the correction capability of ECC without decreasing the storage capacity.

When the data sectors 22 through 25 are successively written or updated, a format which is formed by the format generation circuit 143 is transmitted to the write system circuit 105 in succession. After that, a WG signal is asserted at a position of the first data sector 22 and then the data sector 25 is written before the WG signal is negated. Therefore, even if the writing is performed in a state in which the write-position specified conditions are not satisfied, only a shift of a write start position of the first data sector 22 occurs. Accordingly, data sectors that are adjacent to one another or data sectors including therein a constant data-to-data gap area whose length is smaller than or equal to twice the maximum number of shifted bytes are written. When part of adjacently written data sectors is updated on a data sector basis, it can be estimated that a write start position of each data sector to be updated forms a normal distribution in a direction shown in FIGS. 4(C) and 4(D) with a reference write position shown in FIG. 4(B) being its center.

Read Operation

Next, a method for reading a data sector in an overwritten state, shown in FIGS. 4(C) and 4(D), will be described. As is the case with the data sector 24 shown in FIG. 4(C), if the preamble 39 in the leading end area is overwritten, even if part of the preamble cannot be read, performing read retry usually makes it possible to keep a read clock synchronized. This is because the preamble 39 includes a redundancy part intended for a timing error of a RG signal. If a bit error occurs, there is an increased probability that an error bit will be corrected by means of on-the-fly ECC using ECC having a length of 62 bytes, which includes an additional ECC. Therefore, practically no problem is produced. The significance of providing the data-to-data gap area in the conventional basic format is, if anything, to prevent the trailing end area of a data sector from being overwritten as shown in FIG. 4(D).

If the trailing end area of the data sector 22 is overwritten, there is a case where a bit error cannot be corrected by means of on-the-fly ECC and a read error occurs. In general, if a read error occurs, the magnetic disk drive executes an ERP program to recover the error. The ERP program is stored in a dedicated area of the magnetic disk 10 and executed by the MPU 137. The ERP is constituted of a plurality of error recovery steps. The ERP steps are configured in the order that increases a possibility of recovery, and that does not result in a decrease in performance. If a read error occurs, each ERP step is successively executed. On the completion of each step, read retry is performed (in other words, reading is performed again) to check whether or not the error recovery has succeeded. When the read error cannot be recovered even if all steps are executes, the read error becomes a hard error, which means that data of the data sector in question cannot be read.

The ERP steps includes, for example: a step of changing the amount of off-track that is the amount of deviation between the center of the magnetic head and the track center; and a step of changing a value of a bias current applied to the MR device in a case where the magnetic head includes a MR element. The ERP steps further includes: a step of omitting servo calculation to prevent noises from entering at the time of the servo calculation; a step of adjusting parameters such as a gain and a frequency of the PLL circuit. Moreover, the ERP steps further includes: a second SYNC step that uses a second synchronization signal for synchronization; a step of generating a dummy pulse when a sector pulse cannot be detected from servo data; and a step of decreasing the flying height of the head by decreasing the number of revolutions of the spindle motor so as to remove particles on the magnetic disk. This step is called low spin burnish. When each of the above steps is executed, an error is detected and corrected by means of on-the-fly ECC and a check is made as to whether or not the error recovery has succeeded. In addition, as one of the ERP steps to be executed later, there is erasure correction in which the MPU 137 executes software to correct a read error. Besides the above steps, the ERP steps include many other error recovery steps.

Figure 6:
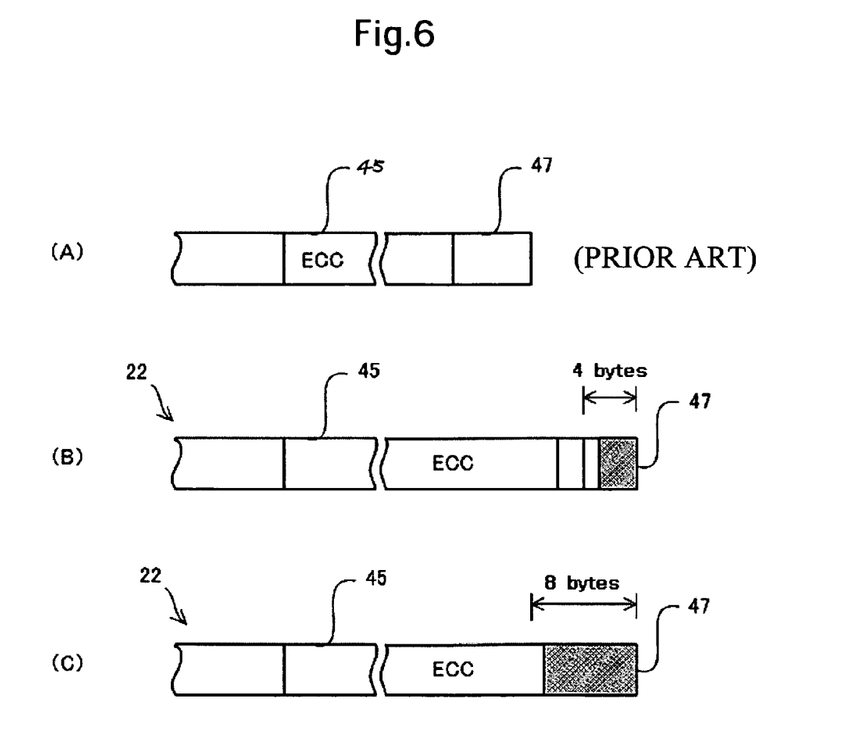
FIGS. 6(A) through 6(C) are diagrams each illustrating a read method for reading an overwritten data sector.

As is the case with the data sector 22 shown in FIG. 4(D), if part of the postamble 47 existing on the end side is, or the whole postamble 47 and part of the ECC 45 are overwritten by the subsequent data sector 23, how the recovery is performed differs depending on the number of overwritten bytes. FIG. 6(A) is a diagram illustrating the conventional format structure that includes the data-to-data gap area having a length of 8 bytes and the ECC 45 having a length of 54 bytes. In this case, the end of a data sector will not be overwritten by the subsequent data sector. FIG. 6(B) is a diagram illustrating a state in which in the basic format including the ECC 45 having a length of 62 bytes as a result of eliminating the data-to-data gap area having a length of 8 bytes according to this embodiment, the postamble 47 existing on the end side of the data sector 22 is overwritten by the preamble 39 of the data sector 23 within a range of 4 bytes that is the maximum number of shifted bytes.

When the data sector 22 is not overwritten at all, the ECC 45 of the data sector 22 has the error correction capability of 31 bytes by means of on-the-fly ECC. Therefore, even if an error whose length is 4 bytes occurs due to overwriting, the error correction capability of 27 bytes remains. To be more specific, this means that in the format structure according to this embodiment, if a range of overwritten area is 4 bytes or less, even if the data-to-data gap area is eliminated, it is possible to make full use of the error correction capability of the ECC having a length of 54 bytes that is adopted in the conventional format structure, or to achieve the higher error correction capability. Moreover, the postamble is used to determine a correct bit value from a bit sequence sampled in the maximum likelihood detection method. Therefore, even if an error occurs in the postamble, this error does not directly and immediately cause an error of data. Because of this, the error correction capability is further improved as compared with that of the conventional format structure.

FIG. 6(C) is a diagram illustrating a state in which a range of an overwritten area increases as compared with that shown in FIG. 6(B), and accordingly the postamble is overwritten in a manner that the overwritten area ranges from 4 to 8 bytes. In the format structure in which the data-to-data gap area having a length of 8 bytes is eliminated, when both of the data sectors 22 and 23 are written or updated in the write-position allowable limit state, the maximum number of overwritten bytes becomes 8. If an area whose length is 8 bytes is overwritten, the error correction capability of the ECC 45 having a length of 62 bytes decreases to 31−8=23 bytes. Therefore, as compared with the conventional format structure having the correction capability of 27 bytes, the probability of the occurrence of a read error increases. As a result, there is a case where even if read retry is performed by the ERP, the read error cannot be recovered by means of on-the-fly ECC.

In contrast to this, in the present embodiment, an erasure pointer is applied to 8 bytes corresponding to the data-to-data gap area G, which is calculated from the trailing end of the data sector 22, so that a correction is made by the known erasure correction adopted in ERP. Although a correct value of the erasure pointer for read data including ECC is unknown, the erasure pointer is position information about a byte in which an error has occurred. Here, with the number of bytes that have been actually overwritten from the trailing end of the data sector, or the number of bytes in which an error occurs as a result of overwriting, being ignored, the erasure pointer is set at 8 bytes that is the maximum number of overwritten bytes calculated from the maximum number of shifted bytes. If a format structure which includes a data-to-data gap area whose number of bytes is smaller than or equal to twice the maximum number of shifted bytes is adopted, the maximum number of overwritten bytes is calculated from the maximum number of shifted bytes and the number of bytes of the data-to-data gap area in the basic format, and then the erasure pointer is set at the maximum number of overwritten bytes.

As far as the erasure correction is concerned, as described in Japanese Patent Application Laid-Open No. Hei 2003-109382, it is possible to correct an error whose length is 2n bytes on the assumption that the error has occurred in data to which ECC having a length of 2n bytes is added. Because the erasure correction is performed as a result of the execution of software as part of the ERP by the MPU 137, it takes longer time than the on-the-fly ECC. However, because the error correction capability becomes twice that of the on-the-fly ECC, even if the trailing end area whose length exceeds 4 bytes is overwritten and a read error occurs, the error can be recovered without decreasing the correction capability to a larger extent as compared with the conventional format. Even if the end of a data sector is filled with not a postamble but ECC, an error can be recovered by the erasure correction by setting an erasure pointer in like manner. Even in the conventional magnetic disk drives, the erasure correction is adopted as, for example, a method in which an occurrence position of thermal asperity (TA) is set at an erasure pointer, and a method in which an erasure pointer is set at intervals of the specified number of bytes from the leading end of a data sector. However, in this embodiment, in addition to the above methods, the erasure correction in which an erasure pointer is set at the maximum number of overwritten bytes from the trailing end of a data sector is added to the ERP. If a data-to-data gap area whose number of bytes is smaller than or equal to twice the maximum number of shifted bytes is formed between data sectors as shown in FIG. 5(C), the maximum number of overwritten bytes becomes smaller than 8 bytes. If the maximum number of overwritten bytes is 6 bytes, the erasure pointer is set at 6 bytes in like manner.

As far as the format according to this embodiment is concerned, if the length of the overwritten trailing end area of a data sector exceeds 4 bytes as a result of eliminating the data-to-data gap area, the correction capability of the on-the-fly ECC decreases to a larger extent as compared with the conventional format. This causes a frequency of the erasure correction to increase, resulting in a decrease in performance. However, rotation jitter occurs with the specified speed being its center. Accordingly, there is a low probability that the length of the overwritten trailing end area of the data sector will be 4 bytes or more. In addition, the host equipment usually writes a plurality of data sectors to the magnetic disk drive by successively addressing the data sectors. As a result, many data sectors are successively written or updated. Therefore, even if the data-to-data gap area is eliminated or shortened, the leading end area or the trailing end area of a data sector is seldom overwritten. On the other hand, many data sectors are adjacently written or are so written that overwriting is performed within a range of 4 bytes. Therefore, the error correction capability by the on-the-fly ECC increases. What is more, because the area to which ECC is added is the data-to-data gap area that is adopted in the conventional format structure, a decrease in storage capacity is further suppressed as compared with the conventional format structure.

Up to this point, the present invention has been described on the basis of the specific embodiments shown in the diagrams. The present invention, however, is not limited to the embodiments illustrated in the diagrams. It is needless to say that so long as the effects of the present invention are produced, any configuration which is known in the past can also be adopted.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive including a magnetic disk in which a first servo sector and a second servo sector which arrives at a magnetic head subsequently to the first servo sector are written at a specified interval on a data track, and a first data sector and a second data sector, each of which includes an error correction code, being written between the first servo sector and the second servo sector, said magnetic disk drive comprising:
  a writing module for writing the first data sector before writing the second data sector so that a leading end area of the second data sector overwrites a trailing end area of the first data sector; and
  a recovery module for executing error recovery procedures for recovering a read error which has occurred in the first data sector that has been overwritten said recovery module recovers, by erasure correction, the read error which has occurred in the first data sector that has been overwritten and wherein at the time of the erasure correction, said recovery module sets the maximum number of overwritten bytes as an erasure pointer from the trailing end of the first data sector.

2. The magnetic disk drive according to claim 1, wherein: said overwritten trailing end area of the first data sector includes the whole or part of a postamble.

3. The magnetic disk drive according to claim 1, wherein: said overwritten trailing end area of the first data sector includes part of the error correction code.

4. The magnetic disk drive according to claim 1, wherein: when said writing module writes the first data sector in a direction toward the second data sector in a write-position allowable limit state and then writes the second data sector in a direction toward the first data sector in the write-position allowable limit state, the leading end area of the second data sector always overwrites the trailing end area of the first data sector.

5. The magnetic disk drive according to claim 1, wherein: when said writing module writes the first data sector at the reference write position thereof and then writes the second data sector at the reference write position thereof, the leading end of the second data sector is adjacent to the trailing end of the first data sector.

6. The magnetic disk drive according to claim 1, wherein: said writing module forms a gap area whose length is less than twice the maximum number of shifted bytes between the trailing end of the first data sector and the leading end of the second data sector under write-position specified conditions.

7. The magnetic disk drive according to claim 1, wherein: when said writing module writes the first data sector and the second data sector in a state in which the write-position specified conditions are not satisfied according to one write command transmitted from host equipment, said writing module writes the first and second data sectors so that the trailing end of the first data sector is adjacent to the leading end of the second data sector.

8. The magnetic disk drive according to claim 1, wherein: said writing module forms a gap area between the trailing end of the first servo sector and the leading end of a data sector that is closest to the first servo sector, and a gap area between the leading end of the second servo sector and the trailing end of a data sector that is closest to the second servo sector.

* * * * *